United States Patent [19]

Harvey

[11] Patent Number: 4,506,304
[45] Date of Patent: Mar. 19, 1985

[54] APPARATUS FOR TRANSFERRING PRE-RECORDED IMAGE SIGNAL INFORMATION FROM ONE RECORDING MEDIUM TO A MASTER RECORDING MEDIUM

[75] Inventor: Donald M. Harvey, Webster, N.Y.
[73] Assignee: Eastman Kodak Company, Rochester, N.Y.
[21] Appl. No.: 374,537
[22] Filed: May 3, 1982
[51] Int. Cl.[3] .......................... G11B 27/02; G11B 5/86
[52] U.S. Cl. ..................................... 360/14.3; 360/15
[58] Field of Search ....................... 360/15, 14.1, 14.2, 360/14.3; 358/342, 311, 22; 369/84

[56] References Cited

U.S. PATENT DOCUMENTS

| 3,864,732 | 2/1975 | Grindley et al. | 360/15 |
| 4,011,401 | 3/1977 | Presti | 358/212 |
| 4,302,776 | 11/1981 | Taylor et al. | 358/160 |
| 4,375,655 | 3/1983 | Korth et al. | 360/15 |
| 4,383,276 | 5/1983 | Makino | 360/10.1 |

FOREIGN PATENT DOCUMENTS 52-3412  11/1977  Japan .................................... 360/15

OTHER PUBLICATIONS

Michele Frank, "The Gadgeteria", Popular Photography, Sep. 1981, pp. 52 and 54.

Primary Examiner—Bernard Konick
Assistant Examiner—Paul Stefanski
Attorney, Agent, or Firm—Robert F. Cody

[57] ABSTRACT

A video disc system adapted for use with a recordable, master storage, video disc and a prerecorded, transfer storage, video disc comprises a turntable for rotating the master disc and the transfer disc in synchronism, a playback head for reading the video signals recorded on the transfer disc, electronic circuitry for editing the video signals read by the playback head, and a record head for recording the edited video signals onto the master disc.

4 Claims, 9 Drawing Figures

APPARATUS FOR TRANSFERRING PRE-RECORDED IMAGE SIGNAL INFORMATION FROM ONE RECORDING MEDIUM TO A MASTER RECORDING MEDIUM

FIELD OF THE INVENTION

This invention relates generally to video disc systems. More particularly, the invention relates to apparatus for processing and recording video images onto rotatable discs.

BACKGROUND OF THE INVENTION

Recently, many devices have been developed for recording individual visual image frames on recording discs, e.g. magnetic video discs. It is advantageous to be able to transfer the images from an inexpensive and/or reuseable disc on which they were initially recorded to a permanent storage disc and, in the process, to edit the images, e.g. by eliminating unwanted images, rotating selected images, selectively cropping images and/or enlarging or decreasing the size of selected images. Such editing techniques are well known in the television art, but are accomplished by electronic means that are prohibitively expensive and complex for amateur or mass market use.

SUMMARY OF THE INVENTION

The present invention provides a simple, compact, inexpensive apparatus for transferring images to a user recordable video disc and to do editing consisting of image elimination, rotation, cropping and/or size changing during the transfer procedure. This is accomplished in accordance with the present invention by a video disc system adapted for use with a recordable, master storage video disc and a prerecorded, transfer storage video disc. The video disc system includes a turntable for rotating the master storage video disc and the transfer storage video disc in synchronism, a playback head for reading the video signals recorded on the transfer storage disc, means coupled to the read head for electronically editing the video signals recorded on the transfer storage video disc and read by the playback head, and a record head coupled to the electronic editing means for recording the transformed video signals onto the master storage video disc.

The invention and its features and advantages will become more apparent by referring to the accompanying drawings and to the ensuing detailed description of the preferred embodiment.

DETAILED DESCRIPTION OF THE PREFERRED EMBODIMENT

Because video disc systems are well known, the present invention will be directed in particular to elements forming part of, or cooperating directly with, apparatus in accordance with the present invention. It is to be understood that elements not specifically shown and described may take various forms well known to those having skill in the video disc art.

Figure 1:
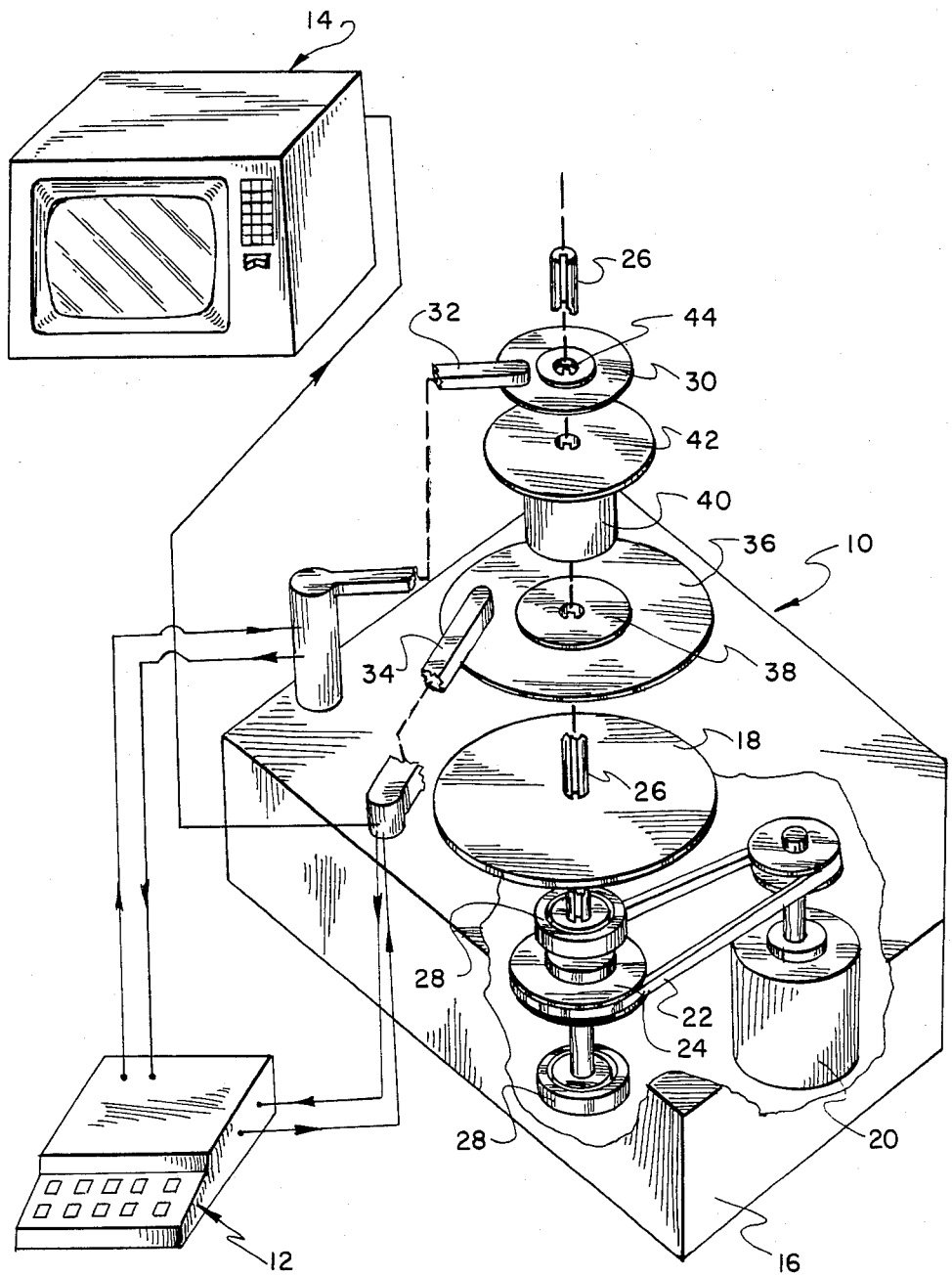
FIG. 1 is a simplified pictorial representation of a video disc system constructed in accordance with the teachings of the present invention.

The video disc system shown in FIG. 1 generally comprises a turntable 10, control electronics 12 and a television display monitor 14. The turntable 10 includes a base support plate 16. Suitably mounted on a bracket (not shown) beneath the base plate 16 is an electronic motor 20 which drives a belt 22 engaged with a pulley 24. The pulley 24 is mounted on and drives a keyed shaft 26, which is supported in a pair of bearing assemblies 28 located beneath the base plate 16, and extends upwardly therefrom.

Mounted on the base plate 16 for cooperation with a prerecorded transfer storage video disc 30 is a playback head 32. In a preferred embodiment of the invention, the transfer storage video disc 30 is a flexible ("floppy"), multitrack, magnetic, video disc having one image stored on each track in the N.T.S.C. signal format. The playback head 32, therefore, in the preferred embodiment of the invention is a magnetic head. Magnetic read heads are well known in the art. A commercial example is the Sony Betamax U-Matic read/write head. It will be understood, however, that the invention is not limited to magnetic video discs, but may, with the selection of an appropriate playback head 32, include other types of a prerecorded video discs such as a "CED" disc (a grooved disc that selectively varies in capacitance) manufactured by RCA, Zenith, Toshiba and Hitachi, a "VHD" disc (a grooveless disc that selectively varies in capacitance) manufactured by Victor Company of Japan, Matsushita and General Electric, and "Laser Vision" disc (an optical disc) manufactured by Magnavox, and Universal Pioneer Corporation.

A record head 34 is also mounted on the base plate 16 and is adapted for cooperation with a user recordable master storage video disc 36. In the preferred embodiment of the invention, the disc 36 is also a floppy, multitrack, magnetic video disc adapted to record one image on each track in the N.T.S.C signal format and the record head 34 is, therefore, also magnetic. Magnetic record heads such as the aforementioned Sony Betamax U-Matic read/write head are commercially available devices. Here again the invention is not limited to master storage magnetic video discs but may, with the selection of an appropriate record head 34 include other types of user recordable discs such as the optical video disc recently demonstrated by Matsushita. This disc has a thin layer of an amorphous tellurium compound that absorbs the energy of a laser beam modulated by a video signal, and selectively changes from an amorphous to a crystalline state. This changes the optical characteristics, and thus the reflectivity of the tellurium recording layer.

To operate the system, the user first attaches the user recordable, master storage disc 36 to the keyed shaft 26 by means of a splined-disc drive hub 38 so that the disc 36 overlies a stabilization plate 18. Next, a similarly keyed spacer 40, having a second stabilization plate 42 attached to its upper end, is attached to the splined shaft so that it overlies the drive hub 38. Finally, the prerecorded, transfer storage disc 30 is attached to the shaft 26 by means of a splined-disc drive hub 44 so that the disc 30 overlies the stabilization plate 42. When the motor 20 of turntable 10 is turned on (by means not shown), the discs 30 and 36 are driven in synchronism by virtue of their mounting on the common shaft 26. Other drive mechanisms, well known in the art, could be used to drive the two discs in synchronism. The common shaft approach, however, is preferred because of its simplicity.

The transfer disc 30 which may be generated by (1) an electronic still camera, (2) a television camera, or (3) by a photofinisher during the processing of film from a conventional still camera, contains a plurality of images, with each image recorded on a separate track in the NTSC format as if the camera was held horizontally. Thus, the images recorded on the transfer disc 30 and read by the playback head 32 are analogous to a strip of uncut transparencies, some images are horizontal, some vertical, some would benefit from cropping and some should be discarded entirely.

The control electronics 12, which is coupled to both the playback head 32 and the record head 34, performs all the necessary editing and imaging processing functions by controlling the sequence and radial location of the image information signals as they are transferred from the transfer storage disc 30 to the master storage disc 36. While a playback capability for displaying the images recorded on the master disc may be eliminated for certain specialized applications or provided by a separate playback head, in the preferred embodiment of the invention the head 34 has a dual record/playback capability.

Figure 2A:
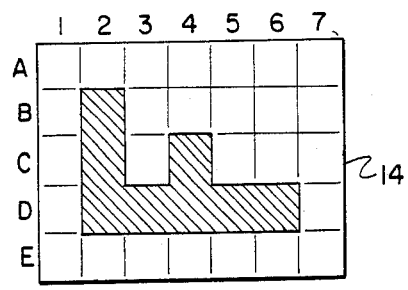
FIGS. 2A and 2B illustrate a technique for rotating an image.
Figure 2B:
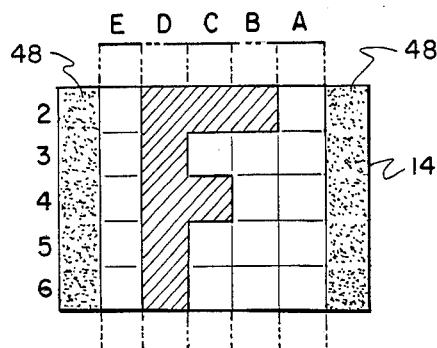

FIGS. 2A and 2B show a method for rotating an image 90° (from a horizontal to a vertical format). In FIG. 2A, which illustrates a horizontal image as originally recorded on the transfer disc 30, the sequence of signals is A1234567, B1234567, C1234567, D1234567, and E1234567. These signals are read by the playback head 32, stored in the control electronics 12, resequenced by the control electronics as (X)2EDCBA(X), (X)3EDCBA(X), (X)3EDCBA(X), (X)5EDCBA(X), and (X)6EDCBA(X) (X=no signal) and recorded on the master storage disc 36 by the record/playback head 34. These resequenced signals when read from the master storage disc 36 by the record/playback head 34 will produce the vertical image shown in FIG. 2B on the display monitor 14. The shaded portions 48 of the image represent the "no signal" portions of the rotated image. By proper sequencing of the transfer signals, the rotation of the image can be 180° if desired.

Figure 3A:
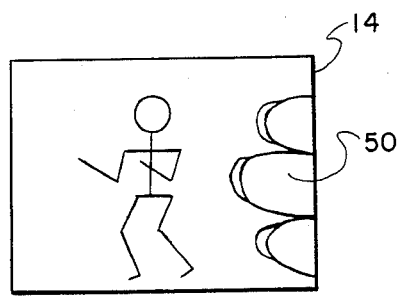
FIGS. 3A and 3B illustrate a technique for cropping an image.
Figure 3B:
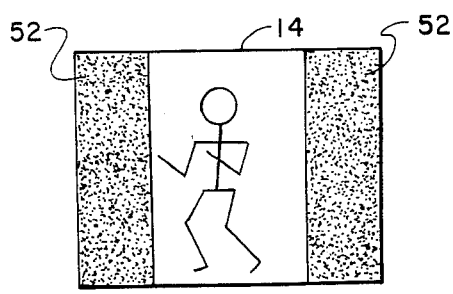

FIGS. 3A and 3B show a method for cropping undesired portions of an image. In FIG. 3A, the image as originally recorded on the transfer disc 30 includes the fingers 50 of the camera operator which were inadvertently placed in front of the camera's picture taking lens. The control electronics 12, by omitting picture information at the beginning and/or end of a scan line, at the beginning or end of a field, or at the beginning or end of a vertical scan, can crop the undesired portions of the originally recorded image so that the image recorded on the master storage disc 36 is as shown in FIG. 3B. The cropped portions of the originally recorded image are indicated by the shaded portions 52.

Figure 4A:
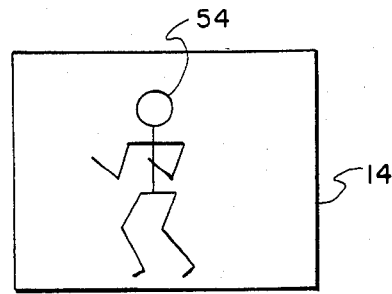
FIGS. 4A, B, and C illustrate a technique for controlling the image size.
Figure 4B:
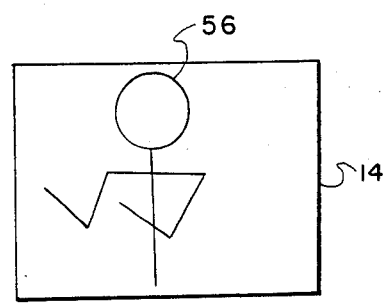
Figure 4C:
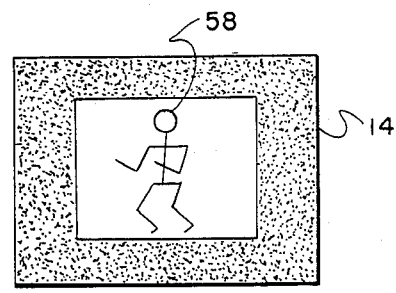

FIG. 4A shows an image 54 as originally recorded on the transfer disc 30. By selectively repeating information signals both vertically and horizontally, the image recorded on the master storage disc 36 can be enlarged as shown in FIG. 4B, image 56, or decreased as shown in FIG. 4C, image 58. The decreased image size is useful to prevent overfilling in case of a rotated vertical image.

Figure 5:
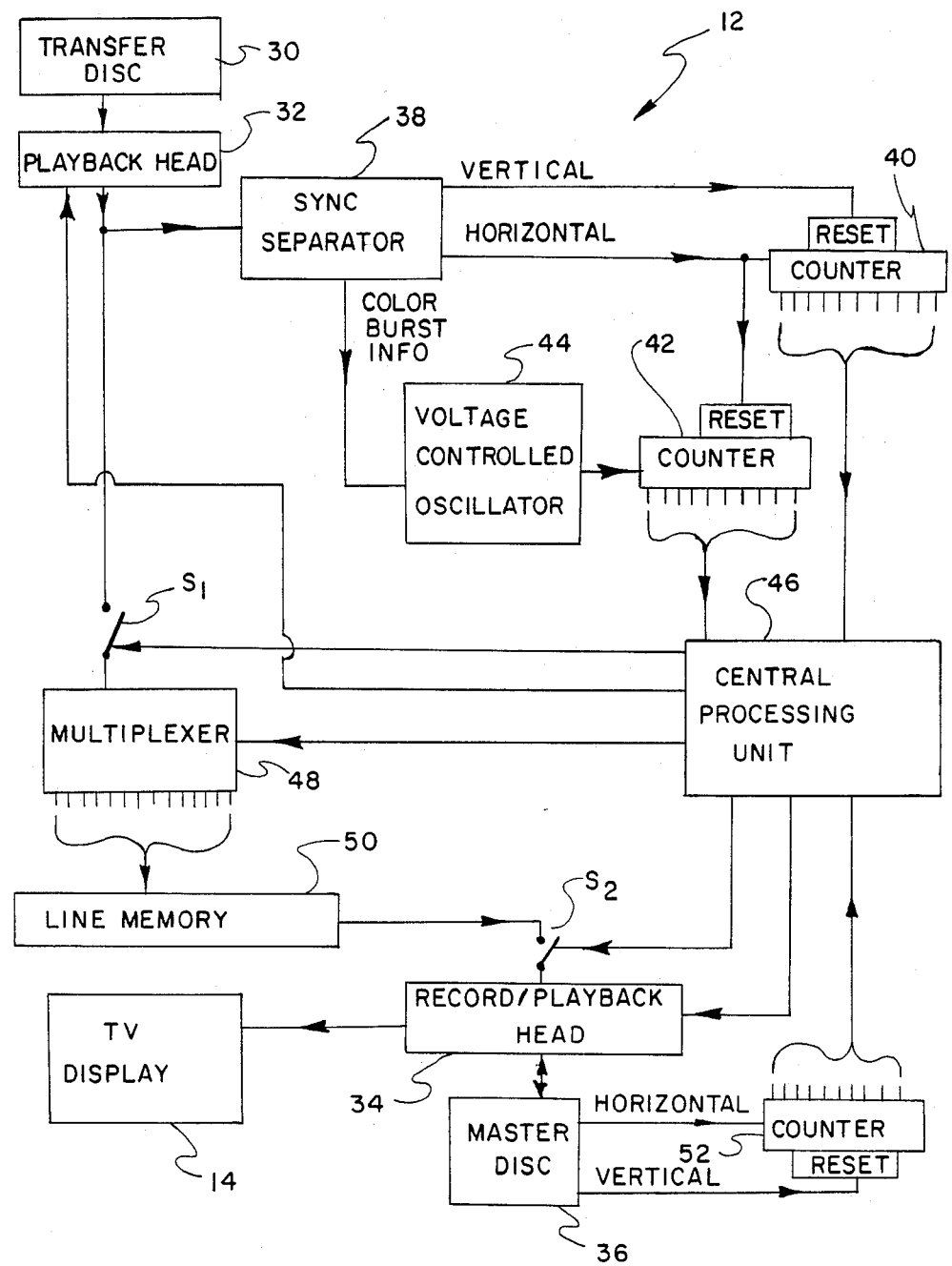
FIG. 5 is a block diagram of a circuit for carrying out the techniques illustrated in FIGS. 2, 3 and 4.

Control electronics for performing the above described editing techniques is shown in FIG. 5.

Such control electronics requires digitized signal information and preferably the N.T.S.C. format video signals are put in digital form as they are recorded on the transfer storage disc 30.

The video signals recorded on the transfer storage disc 30 are read by the playback head 32 and fed to a sync separator 38. The sync separator 38 separates the horizontal and vertical sync signal pulses and the colorburst signal pulses from the composite video signal. The horizontal sync signal pulses are fed to a counter 40 and to the reset terminal of a counter 42 and the vertical sync signal pulses are fed to the reset terminal of the counter 40. The colorburst signal pulses are fed to a voltage controlled oscillator (VCO) 44 and then to the counter 42. The outputs of the counters 40 and 42, which are respectively the line and column addresses of each signal pulse of information (pixel) recorded on the disc 30, are fed to a central processing unit 46 and stored in memory. Assuming (1) a NTSC format video signal is recorded on the disc 30 (i.e., a 4.2 megahertz (mHz) bandwidth signal having 525 horizontal lines and 480 vertical columns and with colorburst signal pulses at 3.58 mHz frequency) and (2) sampling at the Nyquist rate (8.4 mHz); the VCO 44 preferably operates to multiply the frequency of the colorburst signal pulses by a factor of three (3) and the counters 40 and 42 are preferably ten bit counters.

The CPU 46 is operative under one or more stored programs which control the opening and closing of switches $S_1$ and $S_2$. The switches $S_1$ and $S_2$ in turn control, in the manner explained hereinbelow, the sequence and radial location of the individual information signal pulses (pixels) as they are transferred from the storage disc 30 to the master disc 36. To execute the image rotating, image cropping and image magnification techniques as shown in FIGS. 2, 3 and 4 of the drawings, three stored programs would be required.

In operation of the control electronics 12, at the appropriate time during the rotation of the disc 30, the switch $S_1$ is closed by the CPU 46 and a portion of the video signal from the transfer disc 30 (e.g., one horizontal line of one field of an N.T.S.C. format image) is fed to a multiplexer 48. The multiplexer 48, which is operative under the control of the CPU 46, multiplexes the video signal pulses into a sequence, which may include signal pulse deletion in the case of image cropping or signal pulse repetition in this case of image magnification, that is desired for recording on the master disc 36. The output of the multiplexer 48, which is provided in parallel form, is then loaded into a line memory 50.

The master disc 36 has horizontal and vertical sync pulses prerecorded on its tracks for controlling the recording and scanning of the images to be recorded on such tracks. Alternatively, an unrecorded master disc can be used with the horizontal and vertical sync pulses being provided by a shaft encoder or a clock synchronized to the rotation of the turntable 10. A counter 52 receives the horizontal and vertical sync pulses from the master disc 36 and provides the CPU 46 with the beginning address of each horizontal line of each of the two fields to be recorded in each track of the disc 36. At the appropriate time during the rotation of the disc 36, as required to accomplish the desired radial transformation of the information signal pulses stored in the memory 50, the switch $S_2$ is closed by the CPU 46 and the information signal pulses stored in the line memory 50 are serially fed to the record/playback head 34 and recorded on the master disc 36.

In the illustrative embodiment shown in FIG. 5, in which the line memory 50 has only a one horizontal line (N.T.S.C. format) capacity and operates in a serial first in/first out mode, the time required to complete the image transformation process is $(525\times 2/30)=35$ seconds. As is obvious to one skilled in the art, a decrease in the time required for completion of the image transformation process can be achieved by (1) using a line memory which operates in a universal access mode $(525/30=17.5$ seconds) and/or (2) increasing the capacity of the memory. The desired performance goals of the editing apparatus will dictate the particular trade-off between increased image processing speed vis a vis memory cost.

The invention has been described in detail with particular reference to a preferred embodiment thereof, but it will be understood that variations and modifications can be affected within the spirit and scope of the invention. For example, if desired the control electronics, with appropriate circuit additions, can perform other image processing functions such as color balance and/or contrast adjustment.

I claim:

1. Video disc apparatus adapted for use with a recordable, multitrack master storage video disc and a prerecorded multitrack transfer storage video disc, said apparatus comprising:
   shaft means for commonly mounting and rotating said transfer storage video disc and said master storage video disc in synchronism;
   a playback head for reading the signals recorded on said transfer storage video disc;
   means coupled to said playback head for electronically editing the video signals received from said playback head; and
   a record head coupled to said electronic editing means for recording the edited video signals onto said master storage video disc.

2. Video disc apparatus according to claim 1 further comprising a second playback head for reading the signals recorded on said master storage video disc and a video monitor coupled to said playback head for displaying images corresponding to the signals recorded on said master storage video disc.

3. Video disc apparatus adapted for use with a recordable, multitrack master storage video disc and a prerecorded multitrack transfer storage video disc, said apparatus comprising:
   shaft means for commonly mounting and rotating said transfer storage video disc and said master storage video disc in synchronism;
   a playback head for reading the signals recorded on said transfer storage video disc;
   means coupled to said playback head for electronically editing the video signals received from said playback head; and
   a record head coupled to said electronic editing means for recording the edited video signals onto said master storage video disc, wherein said video signals of said transfer storage video disc and said master storage video disc are recorded in the N.T.S.C. format, and said editing means comprises:
   a memory coupled between said playback head and said record head and adapted to receive and temporarily store a portion of the video signals generated from said playback head;
   first address means coupled to said playback head for determining the line and column address of each video signal pulse recorded on said transfer storage video disc and transferred to said memory;
   second address means coupled to said record head for determining the beginning address of each horizontal line in each of the tracks of said master storage video disc; and
   logic means coupled to said playback head, said first and second address means, said memory and said record head and responsive to said first and second address means for controlling (1) the sequence of the video signal pulses received from said playback head and temporarily stored in said memory and (2) the radial location of the video signal pulses recorded by said record head from said memory onto said master storage video disc.

4. Video disc apparatus adapted for use with a recordable, multitrack master storage video disc and a prerecorded multitrack transfer storage disc, said apparatus comprising:
   a base support;
   rotatable shaft means projecting from said base;
   means for rotating said shaft means;
   means for releasably mounting said master video disc at a first location on said shaft means;
   means for releasably mounting said transfer storage video disc at a second location on said shaft means;
   a playback head adjacent said second location for reading the signals recorded on said transfer storage video disc;
   means coupled to said playback head for electronically editing the video signals recorded on the tracks of said transfer storage video disc and read by said playback head; and
   a record head adjacent said first location and coupled to said electronic editing means for recording the edited video signals onto the tracks of said master video disc.

* * * * *